United States Patent [19]

Flogvall

[11] Patent Number: 4,628,220
[45] Date of Patent: Dec. 9, 1986

[54] MOTOR ARRANGEMENT COMPRISING AT LEAST THREE CO-PLANAR CONICAL MOTORS

[75] Inventor: Anders G. Flogvall, Järfälla, Sweden

[73] Assignee: U.S. Philips Corporation, New York, N.Y.

[21] Appl. No.: 507,205

[22] Filed: Jun. 23, 1983

[30] Foreign Application Priority Data

Jun. 23, 1982 [SE] Sweden ............................... 8203884

[51] Int. Cl.⁴ ............................................ H02K 16/00
[52] U.S. Cl. ..................................... 310/114; 310/66; 310/112; 310/154
[58] Field of Search ............... 310/112, 113, 114, 154, 310/261, 254, 66; 323/202, 203; 102/208, 209; 384/109, 110; 244/87

[56] References Cited

U.S. PATENT DOCUMENTS

| 3,444,402 | 5/1969 | Cartier | 310/154 |
| 3,558,948 | 1/1971 | Cory | 310/114 |
| 4,071,794 | 1/1978 | Schoen | 310/154 |

FOREIGN PATENT DOCUMENTS

| 0010685 | 5/1980 | European Pat. Off. | 310/42 |
| 1534857 | 6/1968 | France | 310/114 |
| 0346000 | 5/1937 | Italy | 310/212 |
| 0130700 | 8/1919 | United Kingdom | 310/114 |

Primary Examiner—R. S. Skudy
Attorney, Agent, or Firm—David R. Treacy

[57] ABSTRACT

A compact motor arrangement having at least three equi-angularly-spaced motors having coplanar rotational axes intersecting at a common point. Each motor has an exterior shape of a frustrum of a cone, and a conical air gap, the exterior surfaces of adjoining motors being tangential.

9 Claims, 6 Drawing Figures

MOTOR ARRANGEMENT COMPRISING AT LEAST THREE CO-PLANAR CONICAL MOTORS

BACKGROUND OF THE INVENTION

The invention relates to a motor arrangement comprising at least three electric motors, each comprising a stator having the form of a hollow, tapering, and substantially rotationally symmetrical body and a rotor, the axes of rotation of the motors being substantially arranged in one and the same plane and being so mutually spaced angularly that adjacent axes of rotation intersect each other in a common intersectional point at angles which are substantially equal to 360° divided by the number of comprised motors. The invention also relates to the use of such motor arrangements as rudder motors in missiles.

Arrangements of this type and comprising four conventional torque motors are previously known. By a conventional motor in this case is meant a motor having a cylindrical rotor and a stator adapted thereto. A motor arrangement consisting of four such conventional torque motors is relatively bulky because there is a relatively large space in the center of the motor arrangement which is not used. In some applications, for example as rudder motors in missiles etc., the motor arrangement occupies an inadvantageously large part of the space.

Torque motors of the kind set forth have a torque which is linearly dependent on the length of the rotor-stator unit and approximately related to the square of its diameter. In this connection a motor constant $K_M$ may be defined as:

$$K_M = T_p / \sqrt{P_p}$$

where $T_p$ is the peak torque and $P_p$ peak power input at stall condition.

Electrical motors with a cone-shaped stator per se are previously known (see EP No. A1 0 010 685 FIGS. 13-14 with the corresponding text). However, there are no suggestions in this publication to make the motor exterior concial or to use such motors in a compact motor arrangement comprising more than one motor in a common plane and in an optimal way utilizes an available volume.

SUMMARY OF THE INVENTION

An object of the invention is to provide a compact symmetrical motor arrangement which in an optimal way as regards the torque value and the motor constant value utilizes the available volume.

According to the invention a motor arrangement includes at least three conical motors having substantially co-planar equally spaced rotor axes, and conical exterior surfaces arranged with the thinnest part facing the intersectional point.

According to a preferred embodiment the motor arrangement comprises four electric motors, adjacent axes of rotation intersecting each other at right angles.

The defined rotational symmetrical form implies that the volume of the stator unit may be substantially increased and that the surface of the air gap may be considerably enlarged compared to previously known arrangements. From this follows that the motors obtain a higher motor constant $K_M$.

According to one embodiment of the invention the rotors of the motors are air journalled in order to further increase the motor constant. When using air journalling the air gaps of the motors may be decreased. This implies a higher flux density and hence a larger torque. Besides, an increased cooling of the motors is obtained as an additional effect. According to another embodiment of the invention the magnetic poles in tangentially touching stators may be integrated. As a consequence the rotor diameters may be increased to provide the motors with a larger torque.

The invention will be described in more detail with reference to the accompanying drawing.

DESCRIPTION OF THE PREFERRED EMBODIMENTS

Figure 1:
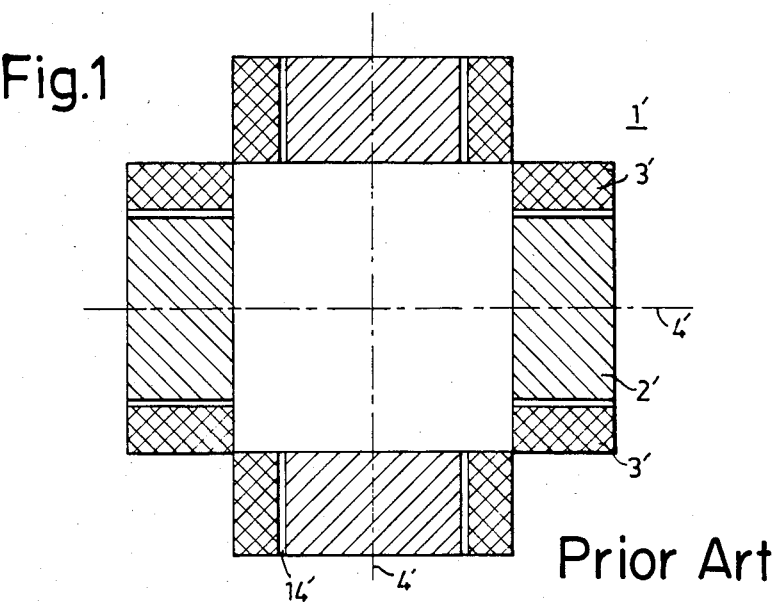
FIG. 1 is a cross section coinciding with the plane of the rotation axes of a prior art arrangement.
Figure 2:
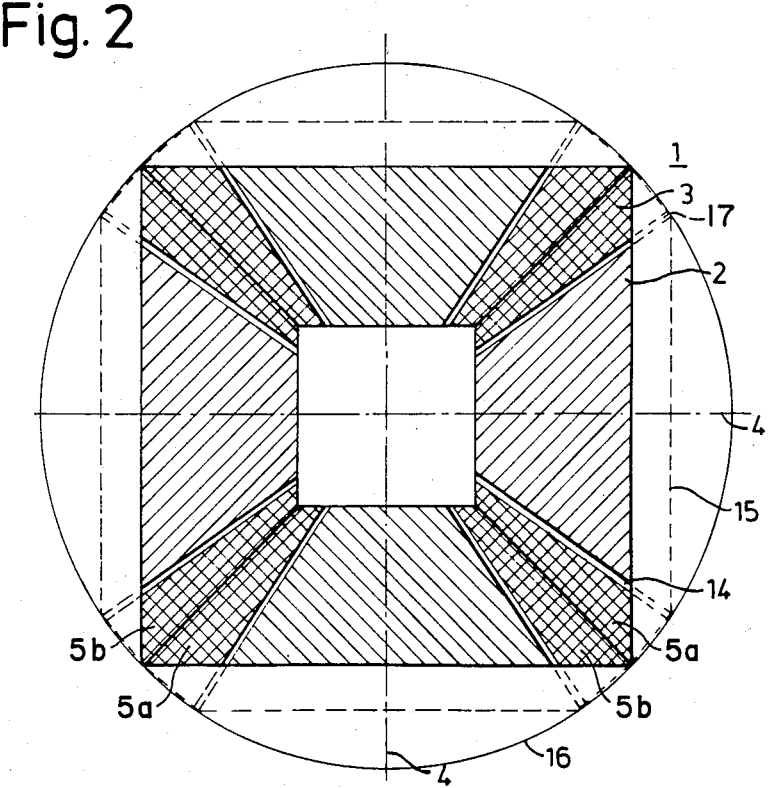
FIG. 2 is a similar cross section of a motor arrangement according to the invention.

According to the previously known embodiment shown in FIG. 1 four conventional torque motors 1' are arranged with their axes of rotation 4' in one and the same plane. The motors 1' are arranged in pairs so that the axes of rotation 4' of two motors coincide and so that axes of rotation 4' that do not conicide are mutually rotated 90°. In order to obtain a symmetrical motor arrangement the distance between the two motors coinciding axes of rotation must as is apparent from FIG. 1 be at least equal to the diameters of the motors 1'. Each motor 1' comprises a cylindrical rotor 2' and a hollow cylindrical stator 3' adapted thereto. An air gap 14' is present between the rotor 2' and the stator 3'. This, such an arrangement is rather bulky.

FIGS. 2-5 show an embodiment of the motor and the motor arrangement according to the invention in which corresponding parts have the same reference numbers but without a prime sign.

According to this embodiment of the invention the motor arrangement comprises four electric motors 1 with their axes of rotation 4 situated in one and the same plane and spaced relative to each other as in the previously known arrangment. Each motor 1 comprises a rotor 2 and a stator 3. The rotors have a rotational symmetrical form similar to a frustrum of a cone and are arranged with the truncated end facing the center of the motor arrangement. The stators 3 consist of rotary symmetrical bodies with a form and exterior surface 23 similar to a hollow frustrum of a cone and are adaped to the rotors 2. The conical shape of the rotors 2 and the stators 3 and thereby the motors 1 themselves enables a very small distance between two opposite motors, because the minimum distance substantially is determined by the diameter at the truncated end surface 7 of the stator 3. Thus each motor has a truncated conical face facing the axis intersection. In order to utilize the available space to a maximum the conical stator should have a conical top angle of about 90°, i.e., a conicity of about 45°. If the motor arrangement is arranged in a space with a circular section, which is the case in missile applications, the surface of the air gaps of the motors can be further increased by extending the rotors 2 and stators 3 at the larger end surfaces 11, 8 (indicated by broken lines 15 in FIG. 2). Thus the air gap 14 can be given an extension 17 almost to a circle 16 that circumscribes the motor arrangement.

Figure 3:
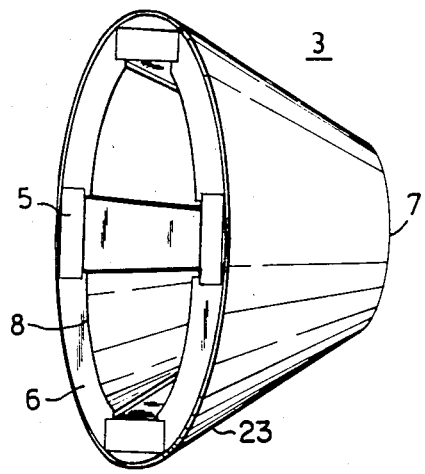
FIG. 3 is a schematic perspective view of a stator of the motor arrangement of FIG. 2.
Figure 5:
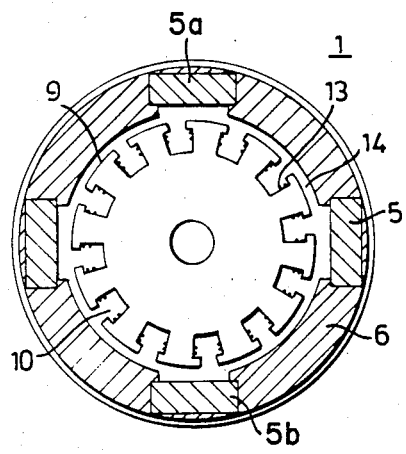
FIG. 5 is a cross section of an assembled stator and rotor, the viewed area being parallel with the end surfaces of the rotor and the stator
Figure 6:
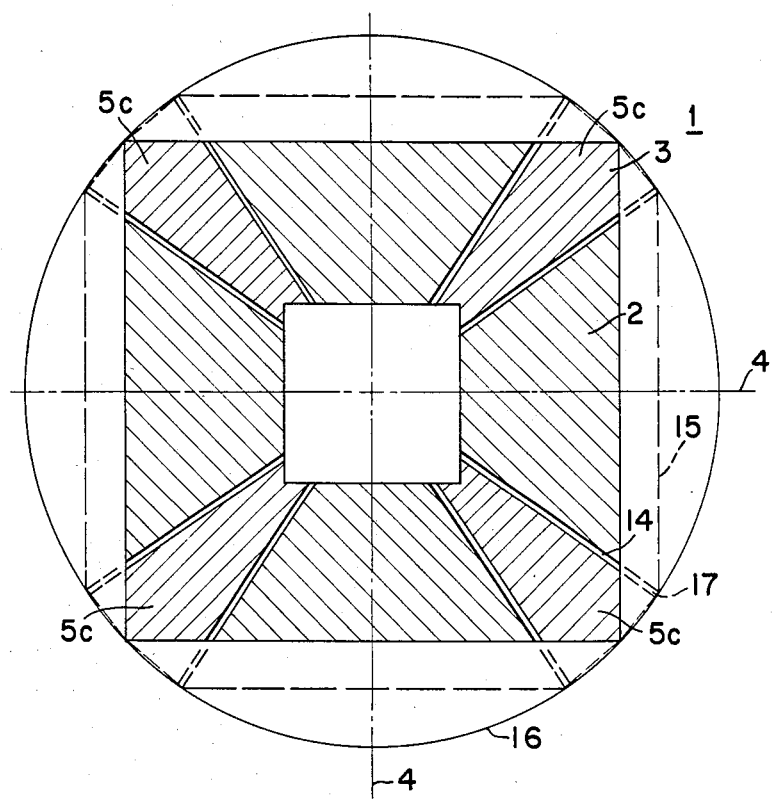
FIG. 6 is a cross-section of a motor arrangement having integral poles.

The conical four pole stator 3, shown in FIGS. 3 and 5, comprises four permanent magnetical areas 5 extending from one end surface 7 to the other 8 and four areas of soft magnetical material 6 such as steel in solid or laminated form situated therebetween. The permanent magnetic areas suitably consist of alnico or rare earths. Although the stator is shown in a four-pole embodiment the number of poles can be chosen arbitrarily. Further, magnetic poles which are tangential to each other can be integrated and form integral magnetic poles 5c as shown in FIG. 6. The four-pole stator shown may, for example, share two of its poles 5a, 5b with adjacent stators.

Figure 4:
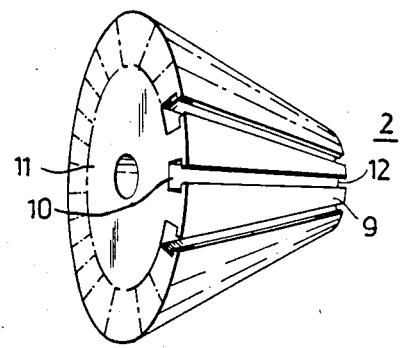
FIG. 4 is a schematic perspective view of one of the rotors of the motor arrangement of FIG. 2.

The rotor, schematically shown in FIG. 4, comprises a conical body 9 having winding grooves, and preferably consists of a laminate. Only three of the winding grooves 10 are shown in the FIG. 4, while the other grooves have been indicated with broken lines. The winding grooves 10 extend from one end surface 11 of the conical body to the other end surface 12. The winding grooves 10 are provided with windings 13, shown in FIG. 5, which windings preferably consist of copper, the windings being wound between the end surfaces 11, 12 of the rotor. Besides, some of the windings can be shortened and wound along the part of the winding grooves being situated immediately adjacent to the larger one 11 of the two end surfaces.

The rotor can, if required, be provided with a commutator of a conventional brush type or an electronic commutator. Such a commutator may suitably be arranged at one of the end surfaces 11, 12 of the rotor.

The motors can be direct current (D.C.) motors and/or alternating current (A.C.) motors and the windings can be provided on the rotor, as shown in FIG. 4, or alternatively on the stator, the rotor then having permanent magnets.

Although the motor arrangement is shown in an embodiment comprising four electric motors, of course the number of motors comprised in a motor arrangement may vary. For example, three motors is a possible alternative as well as five or six.

I claim:

1. A motor arrangement comprising at least three electric motors, axes of rotation of the motors being substantially coplanar and equi-angularly spaced about a common intersection of the axes,
   characterized in that each of said motors has a conical stator having a conical exterior surface, and a conical rotor, said stator and rotor each being a substantially rotational symmetrical body, each of said motors being shaped as a frustrum of a cone having the truncated face facing the intersection.

2. An arrangement as claimed in claim 1, characterized by comprising four of said electric motors, adjacent said axes of rotation intersecting at right angles.

3. An arrangement as claimed in claim 1, characterized in that each of said stators tangentially touches adjoining stators, and has magnetic poles aligned at the lines of tangency thereby forming a pair of tangentially adjoining poles, each said pair being formed as an integral pole.

4. An arrangement as claimed in claim 3, characterized in that the motor arrangement falls within a circumscribing circle, each of said motors being arranged such that each of the air gaps extends almost to said circle.

5. An arrangement as claimed in claim 4, characterized in that each of said rotors comprises winding turns extending along only a part of the rotor length.

6. An arrangement as claimed in claim 3, characterized in that each of said rotors comprises winding turns extending along only a part of the rotor length.

7. An arrangement as claimed in claim 1, characterized in that each of said rotors comprises winding turns extending along only a part of the rotor length.

8. An arrangement as claimed in claim 1, characterized in that each of said stators is shaped as a hollow frustrum of a cone.

9. An arrangement as claimed in claim 1, characterized in that each of said rotors is formed as a tapering, substantially rotational symmetrical body which is a frustrum of a cone.

* * * * *